(12) United States Patent
Tajima

(10) Patent No.: US 8,599,407 B2
(45) Date of Patent: Dec. 3, 2013

(54) OPERATION APPARATUS, PROCESSING SYSTEM, AND COMPUTER READABLE MEDIUM

(75) Inventor: Yukio Tajima, Ebina (JP)

(73) Assignee: Fuji Xerox Co., Ltd., Tokyo (JP)

(*) Notice: Subject to any disclaimer, the term of this patent is extended or adjusted under 35 U.S.C. 154(b) by 716 days.

(21) Appl. No.: 12/419,548

(22) Filed: Apr. 7, 2009

(65) Prior Publication Data

US 2010/0073708 A1 Mar. 25, 2010

(30) Foreign Application Priority Data

Sep. 25, 2008 (JP) ................. 2008-245680

(51) Int. Cl.
*G06F 3/12* (2006.01)
(52) U.S. Cl.
USPC ......... 358/1.15; 358/1.1; 358/1.13; 358/1.14; 709/224; 709/225; 713/182
(58) Field of Classification Search
USPC ........ 358/1.15, 1.1, 1.13, 1.14; 709/224–225; 713/182
See application file for complete search history.

(56) References Cited

U.S. PATENT DOCUMENTS

| | | | | |
|---|---|---|---|---|
| 5,721,904 | A * | 2/1998 | Ito et al. ...................... | 707/769 |
| 6,970,923 | B1 * | 11/2005 | Mukaiyama et al. ......... | 709/223 |
| 7,831,691 | B2 * | 11/2010 | Aoki et al. ................... | 709/219 |
| 7,971,128 | B2 | 6/2011 | Sugiura et al. | |
| 2004/0098478 | A1 * | 5/2004 | Koetke et al. ................ | 709/224 |
| 2006/0069777 | A1 | 3/2006 | Kato et al. | |
| 2007/0291306 | A1 * | 12/2007 | Fujino ......................... | 358/1.15 |
| 2008/0049246 | A1 * | 2/2008 | Kim ............................ | 358/1.15 |
| 2008/0120529 | A1 | 5/2008 | Sugiura et al. | |
| 2008/0174814 | A1 * | 7/2008 | Nagata ........................ | 358/1.15 |

FOREIGN PATENT DOCUMENTS

| | | |
|---|---|---|
| JP | 2002084304 A | 3/2002 |
| JP | 2004-280665 A | 10/2004 |
| JP | 2004-288026 A | 10/2004 |
| JP | 2005-173765 A | 6/2005 |
| JP | 200672785 A | 3/2006 |
| JP | 2008131364 A | 6/2008 |

OTHER PUBLICATIONS

Translation of Japanese Office Action dated Jan. 22, 2013 issued by the Japanese Patent Office in counterpart Japanese Application No. 2008-245680.

Office Action dated Apr. 16, 2013 issued by the Japanese Patent Office in corresponding Japanese Patent Application No. 2008-245680.

* cited by examiner

*Primary Examiner* — Allen H Nguyen
(74) *Attorney, Agent, or Firm* — Sughrue Mion, PLLC

(57) ABSTRACT

An operation apparatus includes: an execution request unit that requests a processing apparatus, which executes a predetermined processing, to execute the predetermined processing; a first receiving unit that receives a notification, from the processing apparatus to which the execution of the predetermined processing is requested, that the execution of the predetermined processing can not be requested due to generation of an error; and a register unit that registers, in a case where the notification is received by the first receiving unit, information that the processing apparatus can not be used, in association with the processing apparatus.

8 Claims, 9 Drawing Sheets

*FIG. 7*

| ROUTINE WORK | STATE | LOCATION OF ERROR | UPDATE | KIND OF ERROR |
|---|---|---|---|---|
| ROUTINE WORK 1 | UNUSABLE | OCR@Server B | 2008.4.11 15:31:23 UPDATE | CONTINUING ERROR |
| ROUTINE WORK 2 | USABLE | | 2008.4.15 11:11:34 UPDATE | |
| ROUTINE WORK 3 | USABLE | | | |
| ROUTINE WORK 4 | UNUSABLE | Jam@Printer C | 2008.4.12 10:34:21 UPDATE | TEMPORAL ERROR |
| ⋮ | ⋮ | ⋮ | ⋮ | ⋮ |

FIG. 9

```
CAUTION!

SELECTED ROUTINE WORK 1 IS
REGISTERED AS NOT BEING EXECUTABLE
DUE TO SYSTEM TROUBLE
```

FIG. 10

```
DO YOU CONFIRM WHETHER OR NOT
ROUTINE WORK 1 IS STILL NOT BEING
EXECUTABLE DUE TO SYSTEM TROUBLE?

[ CONFIRM ]
        [ NOT CONFIRM ]
```

OPERATION APPARATUS, PROCESSING SYSTEM, AND COMPUTER READABLE MEDIUM

CROSS-REFERENCE TO RELATED APPLICATIONS

This application is based on and claims priority under 35 U.S.C. 119 from Japanese Patent Application No. 2008-245680 filed Sep. 25, 2008.

BACKGROUND

Technical Field

The present invention relates to an operation apparatus, a processing system, and a computer readable medium.

SUMMARY

According to an aspect of the present invention, an operation apparatus includes: an execution request unit that requests a processing apparatus, which executes a predetermined processing, to execute the predetermined processing; a first receiving unit that receives a notification, from the processing apparatus to which the execution of the predetermined processing is requested, that the execution of the predetermined processing can not be requested due to generation of an error; and a register unit that registers, in a case where the notification is received by the first receiving unit, information that the processing apparatus can not be used, in association with the processing apparatus.

BRIEF DESCRIPTION OF THE DRAWINGS

Exemplary embodiment of the present invention will be described in detail based on the following figures, wherein:

FIG. 7 is a diagram for explaining the flow table of the image processing apparatus in the processing system according to the embodiment of the invention;

FIG. 9 is a plan view of an image displayed on the touch panel of an operation panel in the image processing apparatus of the processing system according to the embodiment of the invention;

FIG. 10 is a plan view of an image displayed on the touch panel of the operation panel in the image processing apparatus of the processing system according to the embodiment of the invention.

DETAILED DESCRIPTION

Hereinafter, an embodiment of the invention will be explained.

Figure 1:
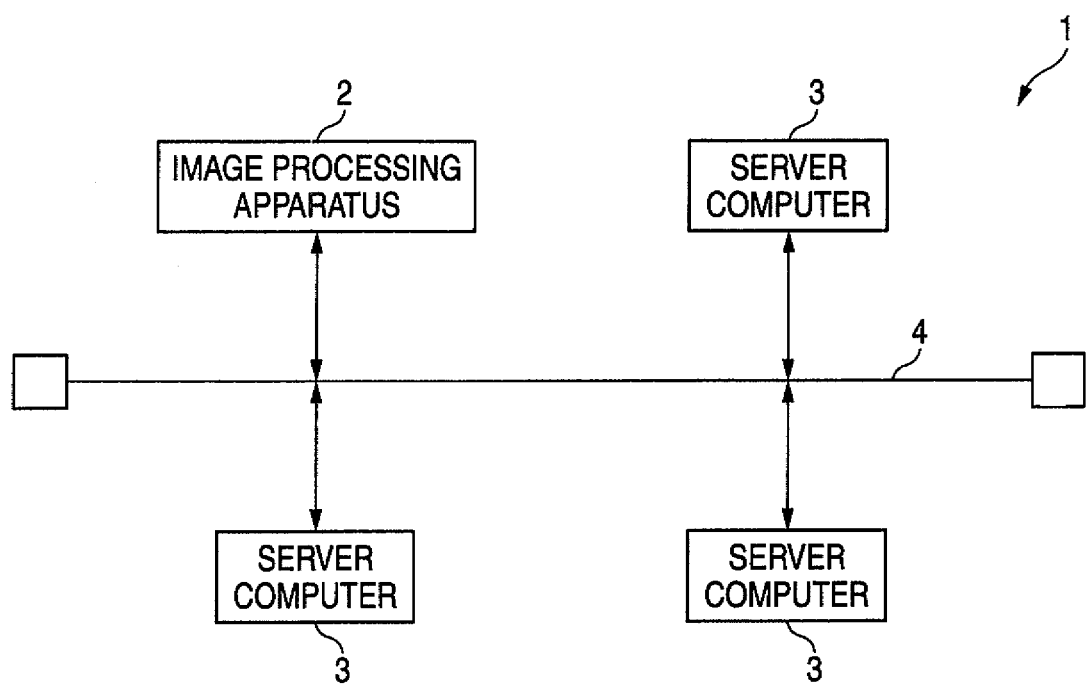
FIG. 1 is a block diagram showing the entire configuration of a processing system according to an embodiment of the invention.

FIG. 1 is a block diagram showing the entire configuration of a processing system according to the embodiment.

The processing system 1 is configured in a manner that one or a plurality of image processing apparatuses 2 and a plurality of server computers 3 are coupled mutually via a network 4 so as to be able to communicate to each other. Further, a printer and a scanner are coupled to the network 4.

Figure 2:
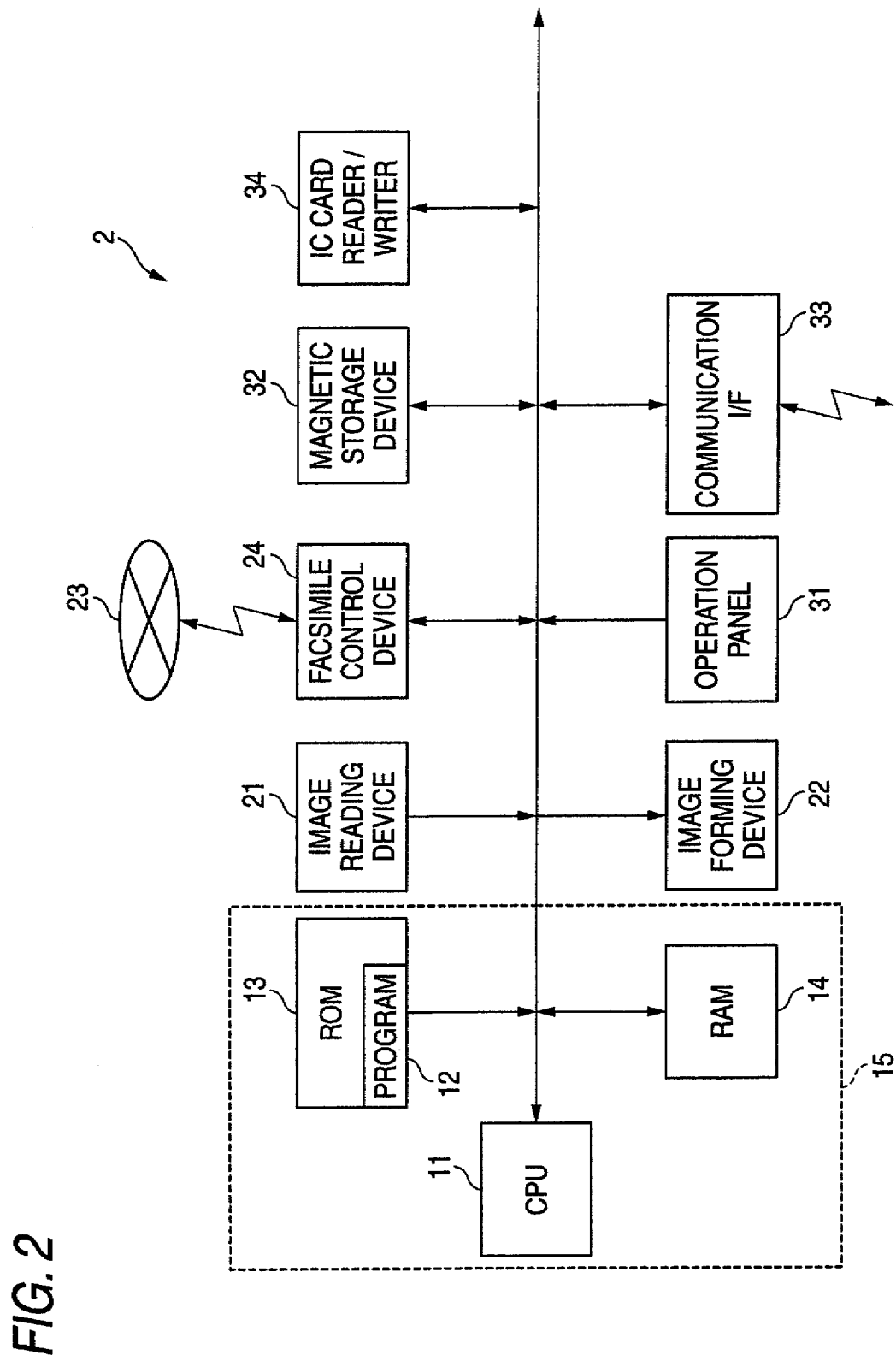
FIG. 2 is a block diagram showing the electrical couplings of the image processing apparatus of the processing system according to the embodiment of the invention.

FIG. 2 is a block diagram showing the electrical couplings of the image processing apparatus 2.

The image processing apparatus 2 includes a main control device 15 which has a CPU 11 for performing various kinds of arithmetical operations and concentrically controlling respective portions, a ROM 13 for storing a program 12 executed by the CPU 11 and various kinds of fixed data and a RAM 14 acting as a work area of the CPU 11.

The main control device 15 is coupled to respective means for performing predetermined processing treating image data, that is, in this embodiment, an image reading device 21 for reading the image of a document, an image forming device 22 for performing the processing of forming an image on a printing medium such as a paper and a facsimile control device 24 for transmitting and receiving facsimile data via a public telephone network 23. Thus, the image processing apparatus 2 can perform various kinds of processing such as a copying, a printing, a facsimile data transmission and reception processing and a scanning processing. The image forming apparatus 22 can employ not only the electrophotographic method but also the ink-jet method, the silver halide photography method, the sublimatic type thermal transfer method, the fusion type thermal transfer method or the direct thermal printing method etc.

Further, the main control device 15 is coupled to an operation panel 31 which has a touch panel and various kinds of operation buttons, accepts varies kinds of operations from a user and displays various kinds of messages to a user, a magnetic storage device 32 for storing various kinds of data etc., a communication interface (I/F) 33 for communicating with a server and a PC via the network 4, and an image memory 34 for storing image data.

The program 12 may be stored in the ROM 13 from the first. Alternatively, the program 12 may be transmitted to the image processing apparatus 2 via the network 4 in the format of a carrier wave and the program 12 thus transmitted may be set up in the magnetic storage device 32 etc. Further alternatively, the program 12 may be provided in a state of being stored in a storage medium such as a CD, DVD or MO, then the storage medium may be read by a reading device and the program 12 thus read may be set up in the magnetic storage device 32 etc.

Figure 3:
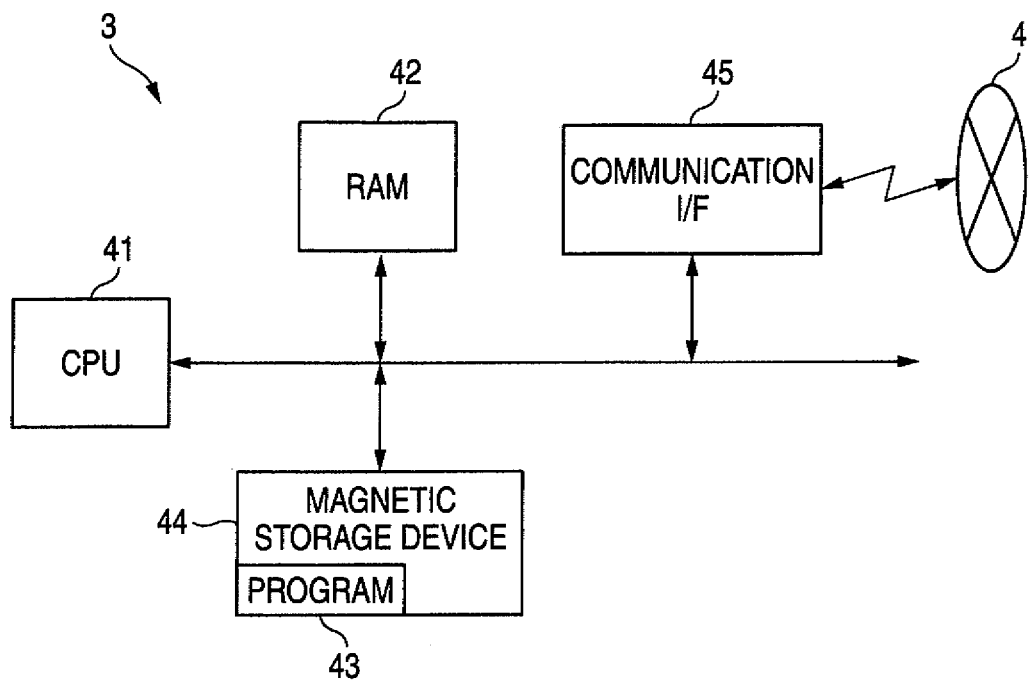
FIG. 3 is a block diagram showing the electrical connections of a server computer according to the embodiment of the invention.

FIG. 3 is a block diagram showing the electrical connections of the server computer 3.

The server computer 3 is configured in a manner that a CPU 41 for performing various kinds of arithmetic operations and concentrically controlling respective portions is coupled to a RAM 42 acting as a work area of the CPU 41, a magnetic storage device 44 for storing a program 43 executed by the CPU 41 and various kinds of fixed data etc., and a communication interface (I/F) 45 for communicating with the image processing apparatus 2 via the network 4.

The program 43 may be stored in the magnetic storage device 44 from the first. Alternatively, the program 43 may be transmitted to the image processing apparatus 2 via the network 4 in the format of a carrier wave and the program 43 thus transmitted may be set up in the magnetic storage device 44 etc. Further alternatively, the program 43 may be provided in a state of being stored in a storage medium such as a CD, DVD or MO, then the storage medium may be read by a reading device and the program 43 thus read may be set up in the magnetic storage device 44 etc.

According to the processing system 1, a user instructs the execution from the image processing apparatus 2 so that respective processing (child processing) are assigned to and executed by a plurality of the server computers 3, whereby a composite processing (parent processing) containing the respective processing can be performed.

For example, in the case where one of the server computers 3 is a document management server for managing document data and another of the server computers 3 is a processing server for subjecting image data obtained by reading a document to an OCR processing, the following series of processing can be performed. That is, image data of a document obtained by being scanned by the image processing apparatus 2 is transmitted to the document management server, then the document management server transfers the image data to the processing server, then the processing server subjects the image data to the OCR processing and sends the processed result to the document management server, whereby the document management server stores the data thus sent.

Figure 4:
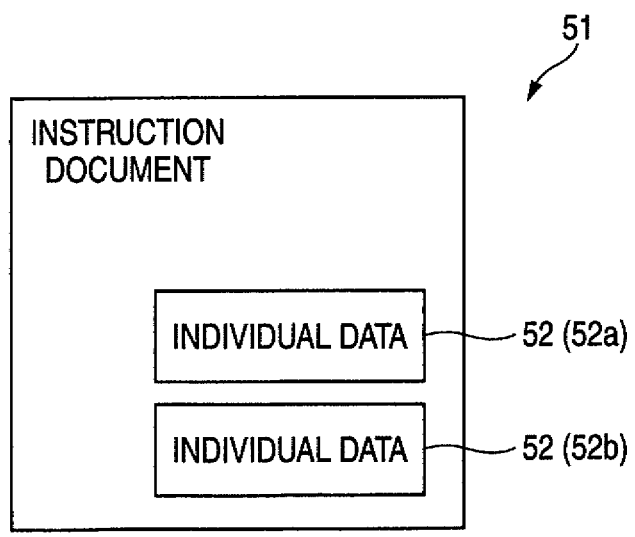
FIG. 4 is a diagram for explaining an instruction document used by the image processing apparatus of the processing system according to the embodiment of the invention.

FIG. 4 is a diagram for explaining an instruction document used by the image processing apparatus 2.

The instruction document 51 is instruction data for the image processing apparatus 2 to instruct the execution of the parent processing composed by the respective child processing. The image processing apparatus 2 stores plural kinds of the instruction documents 51 in the magnetic storage device 32.

The instruction document 51 includes individual data 52 for respectively instructing contents of the processing (child processing) to be executed by the server computers 3 and also includes data for instructing the execution order of the child processing, etc. For example, in the aforesaid example, individual data 52a instructs the contents of the processing to be executed by the document management server and individual data 52b instructs the contents of the processing to be executed by the processing server.

A user can select, by operating the operation panel 31 at the image processing apparatus 2, necessary one of the instruction documents 51 registered in the magnetic storage device 32 and render the processing system 1 to execute the parent processing instructed by the instruction document 51 thus selected. The fact that such plurality of instruction documents 51 are prepared in the image processing apparatus 2 means that the image processing apparatus 2 provides a plural kinds of routine works capable of being instructed so as to be executed. Further, the fact that one of the documents 15 is selected and instructed so as to be executed means that one of the plural kinds of routine works is selected and instructed so as to be executed.

Hereinafter, explanation will be made as to the concrete contents of the processing executed by the processing system 1.

In this case, the explanation is made as to a case where the image processing apparatus 2 renders the two server computers 3, that is, a serve A and a server B to execute the processing according to the instruction document 51. For example, in the case of the aforesaid series of the processing where image data of a document obtained by being scanned by the image processing apparatus 2 is transmitted to the document management server, then the document management server transfers the image data to the processing server, then the processing server subjects the image data to the OCR processing and sends the processed result to the document management server, whereby the document management server stores the data thus sent, the sever A is the document management server and the server B is the processing server.

Figure 5:
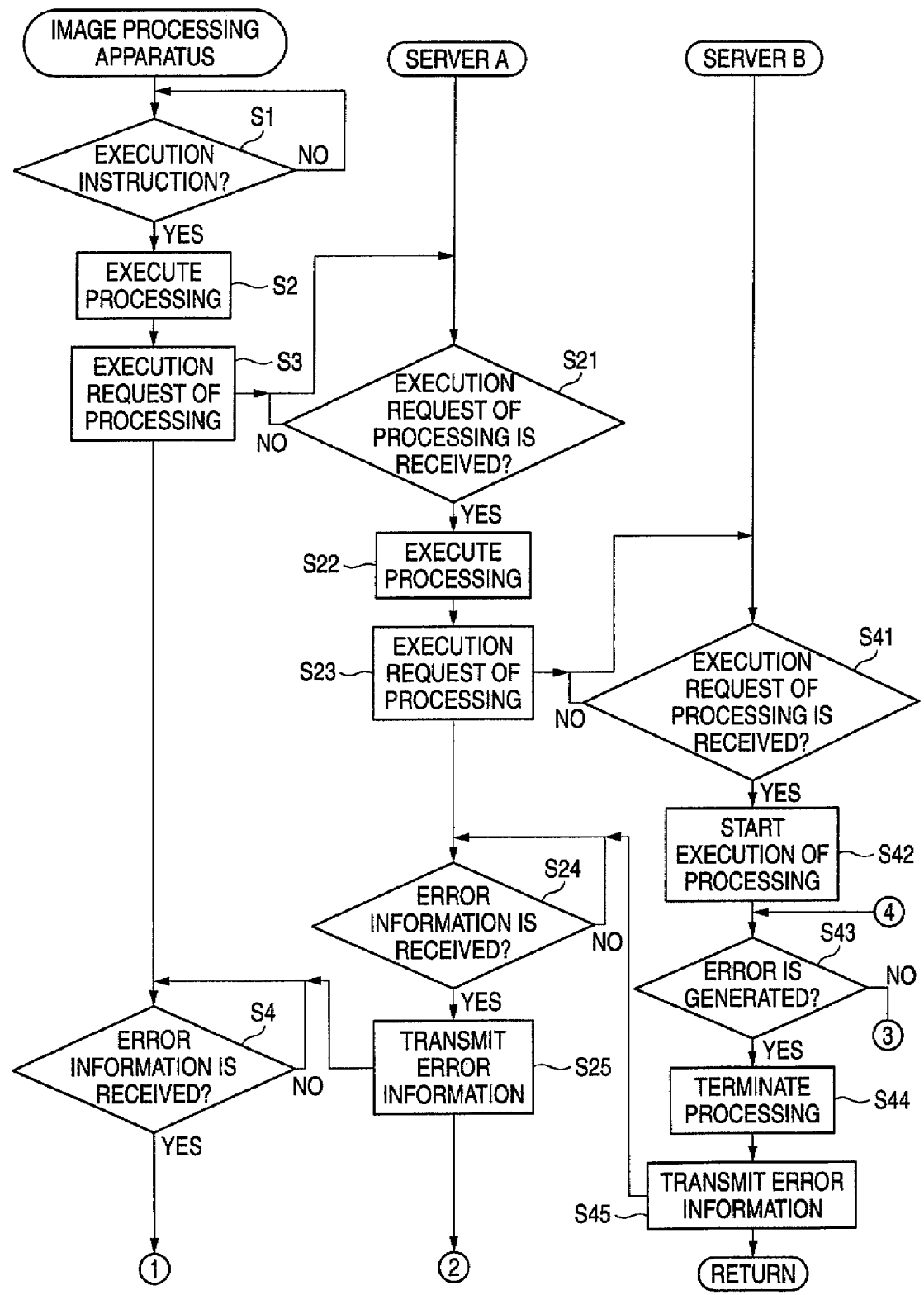
FIG. 5 is a flowchart in the case where the processing system according to the embodiment of the invention performs a routine work in accordance with an instruction document.
Figure 6:
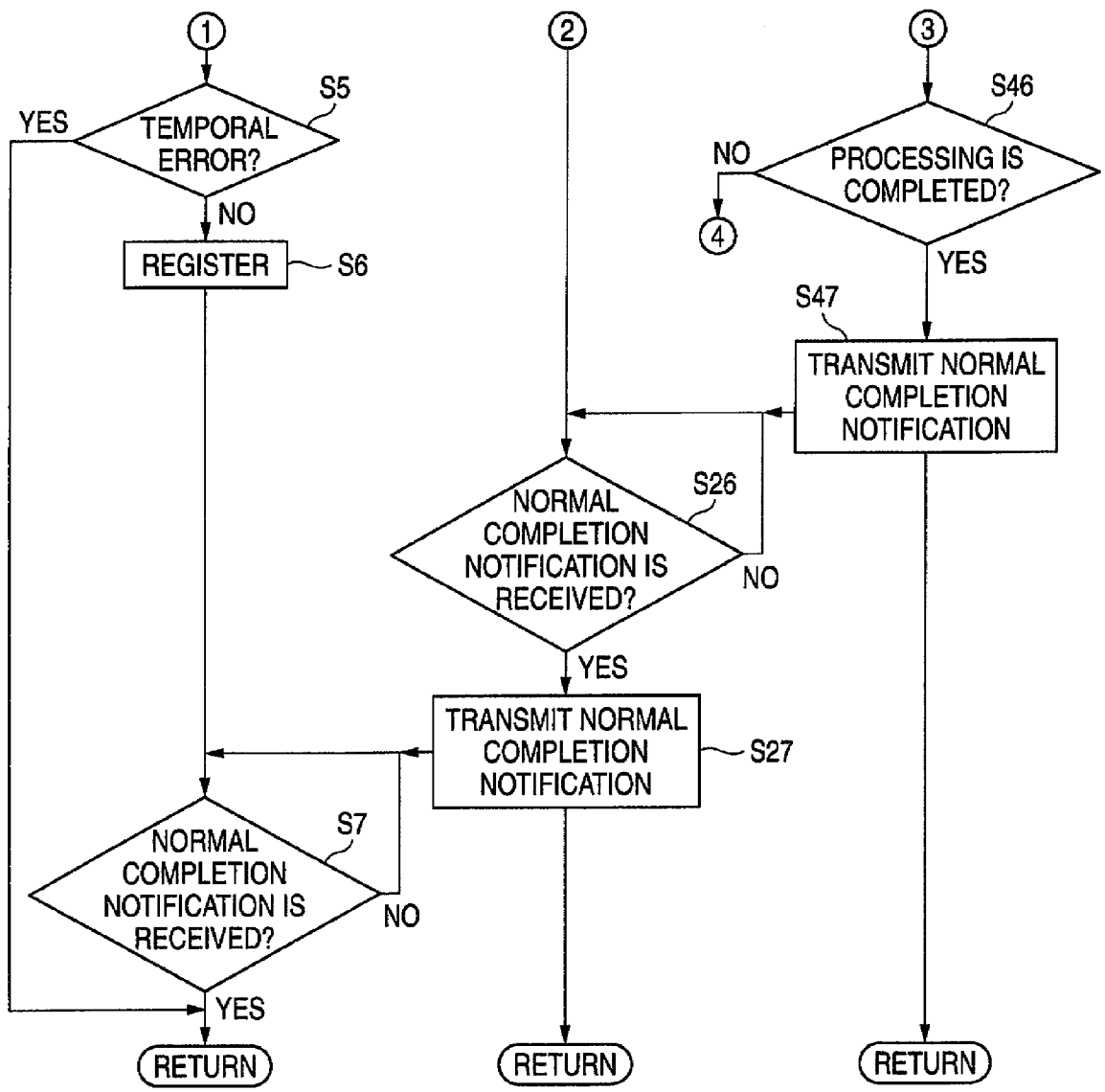
FIG. 6 is a flowchart in the case where the processing system according to the embodiment of the invention performs the routine work in accordance with the instruction document.

FIGS. 5 and 6 are flowcharts of the processing system 1 in the case of performing the routine work in accordance with the instruction document 51.

First, when a user operates the operation panel 31 to select the instruction document 51 and instructs the execution thereof (Yes in step S1), the processing to be performed by the image processing apparatus 2 is executed based on the instruction document 51 (step S2). Then, an execution request of the processing based on the instruction document 51 is transmitted to the server A for performing the processing based on the instruction document 51 next (step S3).

When the server A receives the execution request (Yes in step S2), this server executes the processing to be executed by itself based on the instruction document 51 (step S22). Then, an execution request of the processing based on the instruction document 51 is transmitted to the server B for performing the processing based on the instruction document 51 next (step S23).

When the server B receives the execution request (Yes in step S41), this server executes the processing to be executed by itself based on the instruction document 51 (step S42). If an error is generated in the server B and it becomes difficult to continue the processing at this server (Yes in step S43), the processing is terminated (step S44) and error information notifying that the error is generated in the server B and it becomes difficult to continue the processing at this server is transmitted to the server A (step S45). The error information also contains the kind of the error such as a temporal error or an error continuing to some extent and contains the location of the error (a device where the error is generated (the server B in this case)). When the server A receives the error information (Yes in step S24), this server transmits the error information to the image processing apparatus 2 as the request destination of the processing (step S25).

When the image processing apparatus 2 receives the error information (Yes in step S4), this image processing apparatus registers the contents of the error information thus received in a flow table shown in FIG. 7 (step S6) in the case where the error is not the temporal error (information as to whether the error is temporal or continuous is contained in the error information) (No in step S5).

In the flow table, "state", "location of error" and "kind of error" are registered in association with each of the routine works (routine work 1, routine work 2, routine work 3, etc) specified by the respective instruction documents 51. In the "state", "unusable" is registered when there arises a fact that the processing can not be executed due to the generation of an error at an external device for executing a routine work despite that the image processing apparatus 2 instructs the execution of the routine work, whilst "usable" is registered when there does not arise such the fact. In the "location of error", a device where an error occurs indicated by the error information is registered Returning to FIGS. 5 and 6, in step S6, "unusable" is registered in the "state" in association with the routine work of the instruction document 51 which is instructed so as to be executed in step S1, and the device where an error occurs indicated by the error information is registered in the "location of error". Further, information as to whether the error is temporal or continuous is registered in the "kind of error".

In contrast, in the case where an error is not generated in the server B (No in step S43), a normal completion notification is transmitted to the server A (step S47) when the processing is completed (Yes in step S46). When the server A receives the normal completion notification, (Yes in step S26), this server transmits the normal completion notification to the image processing apparatus 2 (step S27), whereby the image processing apparatus 2 receives the normal completion notification (step S7). Thus, the image processing apparatus 2 can be notified that the processing of the routine work based on the instruction document 51 is completed.

Figure 8:
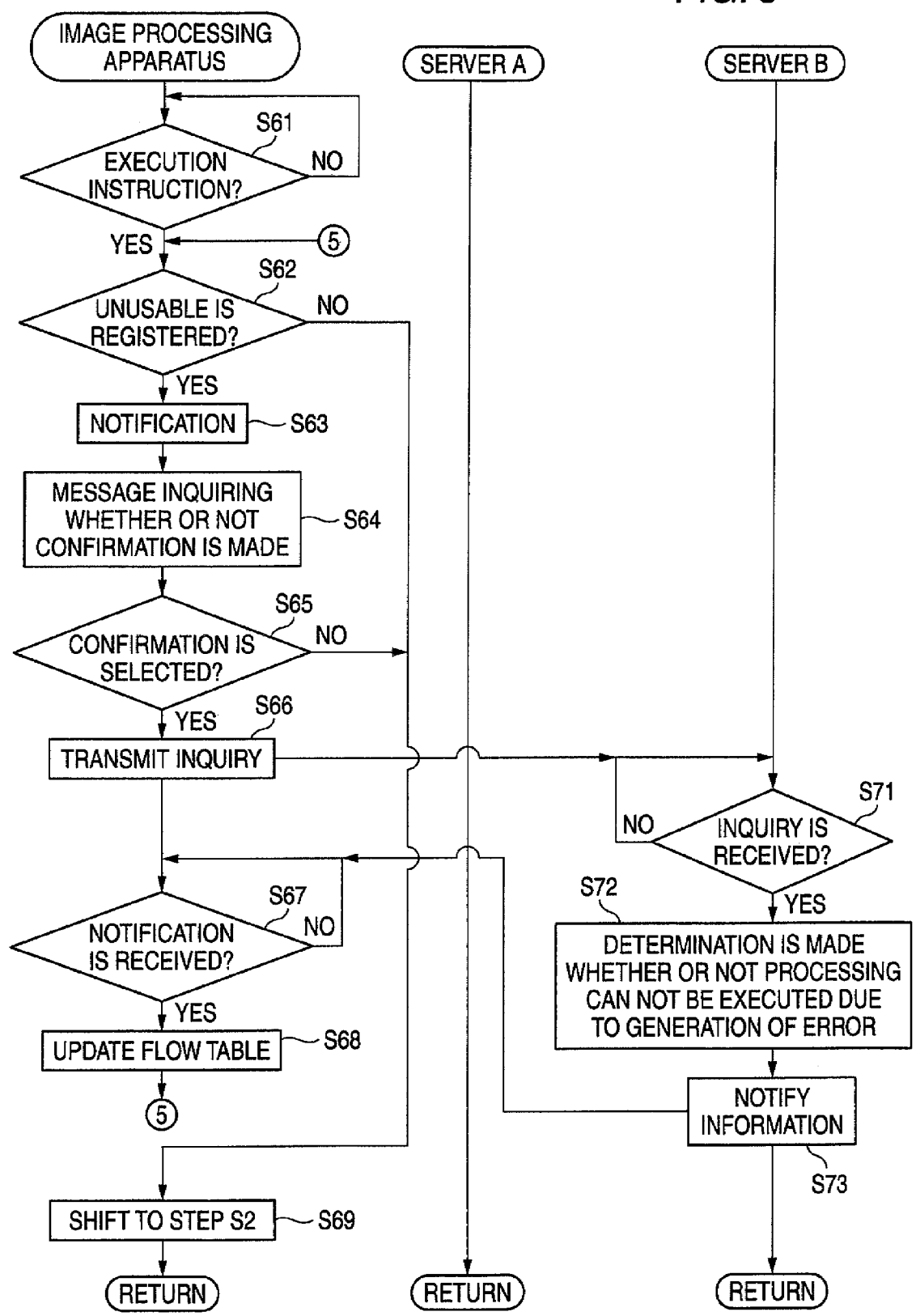
FIG. 8 is a flowchart showing the processing in the case where the flow table includes a routine work as to which unusable is registered, in the image processing apparatus of the processing system according to the embodiment of the invention.

FIG. 8 is a flowchart showing the processing in the case where the flow table includes a routine work as to which the unusable is registered.

First, when a user operates the operation panel 31 of the image processing apparatus 2 to select the instruction document 51 and instructs the execution thereof (Yes in step S61), it is determined whether or not there is a routine work as to which the unusable is registered in the flow table (step S62). When there is a routine work as to which the unusable is registered (Yes in step S62), a message representing that the unusable is registered as to the routine work is displayed on the touch panel of the operation panel 31 to thereby notify to the user (see FIG. 9) (step S63).

Then, a message inquiring whether or not the routine work is still unusable is displayed on the touch panel of the operation panel 31 (see FIG. 10) (step S64). When the confirmation as to whether or not the routine work is still unusable is selected by using the operation panel 31 (Yes in step S65), an inquiry asking whether or not the processing can not be executed due to the generation of the error is transmitted to the device (the server B in this example) registered as the "location of error" as to the routine work (step S66).

When the device (the server B in this example) receives the inquiry (Yes in step S71), the device determines whether or not the processing can not be executed due to the generation of the error (step S72) and notifies the information as to the determination to the image processing apparatus 2 (step S73).

When the image processing apparatus receives this notification (Yes in step S67), the apparatus updates the flow table of FIG. 7 by the contents of the notification (step S68) and the processing returns to step S62. That is, the "unusable" is maintained when the processing still can not be executed due to the generation of the error, whist the state is changed into the "usable" when the error is eliminated and the processing can be executed now. In each case, the updated date/time is inputted in the "update". Then, the process returns to step S62.

In contrast, when there is no routine work as to which the unusable is registered (No in step S62) or when the confirmation as to whether or not the routine work is still unusable is not selected by using the operation panel 31 (No in step S65), the processing proceeds to step S2 of the processing of FIG. 4 (step S69) and then the processing of step S2 and the succeeding processing are executed.

Figure 11:
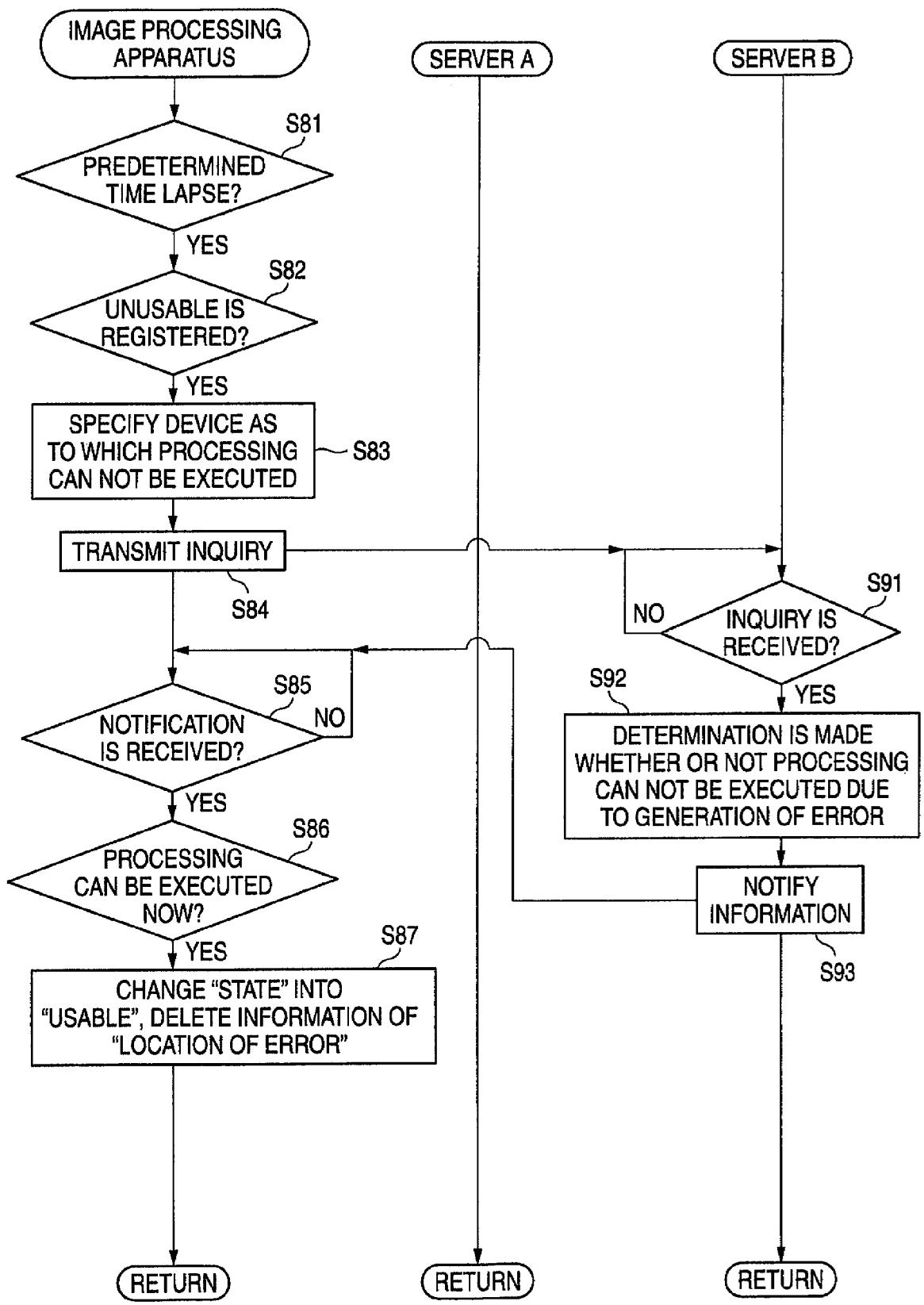
FIG. 11 is a flowchart showing a processing of periodically inquiring whether or not an error is generated and so a processing can not be executed, in the image processing apparatus of the processing system according to the embodiment of the invention.

FIG. 11 is a flowchart showing the processing for periodically inquiring whether or not the processing can not be executed due to the generation of an error.

When a predetermined time lapses after the previous execution of the processing of FIG. 11 (Yes in step S81), it is determined whether or not there is a routine work as to which the unusable is registered in the flow table (step S82). When there is a routine work as to which the unusable is registered (Yes in step S82), an external device as to which the processing can not be executed due to the generation of an error is specified based on the information of the "location of error" in association with the routine work as to which the unusable is registered in the flow table (step S83). Then, an inquiry asking whether or not the processing can not be executed due to the generation of the error is transmitted to the device (the server B in this example) registered as the "location of error" (step S84).

When the device (the server B in this example) receives the inquiry (Yes in step S91), the device determines whether or not the processing can not be executed due to the generation of the error (step S972) and notifies the information as to the determination to the image processing apparatus 2 (step S93).

In the case where the image processing apparatus receives this notification (Yes in step S85), when it is determined according to the notifications that the external device as to which the processing has not been executed due to the generation of the error can now execute the processing (Yes in step S86), the apparatus changes the "state" as to the routine work of the flow table into the "usable" and deletes the information registered in the "location of error" (step S87).

According to the processing system 1 described above, it is possible to know in advance that a user can not hereinafter perform the processing of the routine work as to which the unusable is registered in the flow table of the image processing apparatus 2.

Further, it is possible to know that, as to the routine work for which the unusable is registered in the flow table, a user can execute the processing of the routine work hereinafter when the error of the server computer 3 is eliminated and the processing can be performed.

The foregoing description of the embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention defined by the following claims and their equivalents.

What is claimed is:

1. An operation apparatus comprising:
    an execution request unit that requests a plurality of processing apparatus to execute respective components of a composite processing;
    a first receiving unit that receives a notification, from one of the plurality processing apparatuses that have been requested to execute the respective components of the composite processing, that execution of one of the respective components of the composite processing cannot be executed by an erroneous one of the plurality of processing apparatuses due to generation of an error;

a register unit that registers, in response to the notification being received by the first receiving unit, information indicating whether the error is temporally occurring or continuously occurring, wherein in response to the error being continuously occurring, the register unit registers information indicating that the erroneous one of the plurality of processing apparatuses cannot be used; and an inquiry unit that, in response to use of the erroneous one of the plurality of processing apparatuses, which has been registered in the register unit as an apparatus which cannot be used, being requested, then inquires whether a confirmation is requested to be performed as to whether the erroneous one of the plurality of processing apparatuses cannot currently be used, wherein, in response to the confirmation being requested to be performed, then the inquiry unit further inquires whether the erroneous one of the plurality of processing apparatuses, which is registered in the register unit as an apparatus which cannot be used, cannot currently be used, and wherein, in response to the confirmation not being requested to be performed, then the execution request unit requests that the erroneous one of the plurality of processing apparatuses, which is registered in the register unit as an apparatus which cannot be used, perform the one of the respective components of the composite processing.

2. The operation apparatus as claimed in claim 1, further comprising:

a notifying unit that notifies, in response to the information that the erroneous one of the plurality of processing apparatuses cannot be used being registered in the register unit, the information that the erroneous one of the plurality of processing apparatuses cannot be used.

3. The operation apparatus as claimed in claim 1, further comprising:

a second receiving unit that receives a notification representing whether or not the error is eliminated; and a delete unit that deletes, in response to the second receiving unit receiving the notification representing that the error is eliminated, the information indicating that the erroneous one of the plurality of processing apparatuses cannot be used that is registered in the register unit.

4. The operation apparatus according to claim 1, wherein an instruction document includes the components of the composite processing, each of which is to be performed by a respective one of the plurality of processing apparatuses, wherein the plurality of processing apparatuses comprise image processing apparatuses, and wherein, in response to at least one of the components of the composite processing in the instruction document not being performed, then the register unit identifies the at least one of the components of the composite processing that is not performed and registers information that the at least one of the components of the composite processing identified cannot be performed.

5. The operation apparatus according to claim 4, wherein, in response to performing of the at least one of the components of the composite processing identified being requested, then the inquiry unit inquires as to whether a confirmation is to be performed as to whether the at least one of the components of the composite processing identified can currently be used.

6. The operation apparatus according to claim 1, further comprising an inquiry receiving apparatus which receives the inquiry as to whether the erroneous one of the plurality of processing apparatuses cannot currently be used, determines whether the erroneous one of the plurality of processing apparatuses cannot currently be used, and then notifies the register unit of the determination result, wherein, if the inquiry receiving apparatus determines that the erroneous one of the plurality of processing apparatuses, which is registered in the register unit as an apparatus which cannot be used, can be currently used, then the register unit updates the information registered in the register unit to indicate that the erroneous one of the plurality of processing apparatuses can currently be used, and wherein, if the inquiry receiving apparatus determines that the erroneous one of the plurality of processing apparatuses, which is registered in the register unit as an apparatus which cannot be used, cannot currently be used, then the register unit keeps the information registered in the register unit indicating that the erroneous one of the plurality of processing apparatuses cannot be used.

7. A processing system comprising:

a plurality of processing apparatuses that execute respective components of a composite processing;

an operation apparatus that includes an execution request unit requesting the plurality of processing apparatuses to execute the respective components of the composite processing; and a communication unit that communicates between at least one of the plurality of processing apparatuses and the operation apparatus, wherein the operation apparatus includes:

a first receiving unit that receives, from one of the plurality of processing apparatuses that have been requested to execute respective components of the composite processing, a notification that execution of one of the respective components of the composite processing cannot be executed by an erroneous one of the plurality of processing apparatuses due to generation of an error;

a register unit that registers, in response to the notification being received by the first receiving unit, information indicating whether the error is temporally occurring or continuously occurring, wherein in response to the error being continuously occurring, the register unit registers information indicating that the erroneous one of the plurality of processing apparatuses cannot be used; and an inquiry unit that, in response to use of the erroneous one of the plurality of processing apparatuses being requested, then inquires whether a confirmation is requested to be performed as to whether the erroneous one of the plurality of processing apparatuses cannot currently be used, wherein, in response to the confirmation being requested to be performed, then the inquiry unit further inquires whether the erroneous one of the plurality of processing apparatuses, which is registered in the register unit as an apparatus which cannot be used, cannot currently be used, and wherein, in response to the confirmation not being requested to be performed, then the execution request unit requests that the erroneous one of the plurality of processing apparatuses, which is registered in the register unit as an apparatus which cannot be used, perform the one of the respective components of the composite processing.

8. A non-transitory computer readable medium storing a program causing a computer to execute a process comprising:

requesting a plurality of processing apparatuses to execute the respective components of a composite processing;

receiving a notification, from one of the plurality of processing apparatuses that have been requested to execute respective components the composite processing, that execution of one of the respective components of the composite processing cannot be executed by an erroneous one of the plurality of processing apparatuses due to generation of an error;

registering, in response to the notification being received in the receiving operation, information indicating whether the error is temporally occurring or continuously occurring, registering, in response to the error being continuously occurring, information indicating that the erroneous one of the plurality of processing apparatuses cannot be used;

in response to the use of the erroneous one of the plurality of processing apparatuses being requested, then inquiring whether a confirmation is requested to be performed as to whether the erroneous one of the plurality of processing apparatuses cannot currently be used;

in response to the confirmation being requested to be performed, then further inquiring whether the erroneous one of the plurality of processing apparatuses which is registered as an apparatus which cannot be used, cannot currently be used; and in response to the confirmation not being requested to be performed, then requesting that the erroneous one of the plurality of processing apparatuses, which is registered as an apparatus which cannot be used, perform the one of the respective components of the composite processing.

* * * * *